US011110396B2

(12) United States Patent
Minami et al.

(10) Patent No.: US 11,110,396 B2
(45) Date of Patent: Sep. 7, 2021

(54) CATALYST FOR PURIFICATION OF EXHAUST GAS FROM INTERNAL COMBUSTION ENGINE AND EXHAUST GAS PURIFYING METHOD USING THE CATALYST

(71) Applicant: UMICORE SHOKUBAI JAPAN CO., LTD., Tokoname (JP)

(72) Inventors: Shigekazu Minami, Himeji (JP); Masanori Ikeda, Himeji (JP); Yuta Akasaka, Himeji (JP); Hirotaka Kuno, Himeji (JP); Hideki Goto, Himeji (JP)

(73) Assignee: UMICORE SHOKUBAI JAPAN CO., LTD., Tokoname (JP)

( * ) Notice: Subject to any disclaimer, the term of this patent is extended or adjusted under 35 U.S.C. 154(b) by 351 days.

(21) Appl. No.: 15/564,085

(22) PCT Filed: Apr. 7, 2016

(86) PCT No.: PCT/JP2016/061462
§ 371 (c)(1),
(2) Date: Oct. 3, 2017

(87) PCT Pub. No.: WO2016/163488
PCT Pub. Date: Oct. 13, 2016

(65) Prior Publication Data
US 2018/0133651 A1 May 17, 2018

(30) Foreign Application Priority Data
Apr. 7, 2015 (JP) .............................. JP2015-078742

(51) Int. Cl.
*B01D 53/94* (2006.01)
*B01J 23/63* (2006.01)
(Continued)

(52) U.S. Cl.
CPC ......... *B01D 53/9445* (2013.01); *B01D 53/94* (2013.01); *B01D 53/945* (2013.01);
(Continued)

(58) Field of Classification Search
CPC ............ B01D 53/9445; B01D 2258/01; B01D 2255/2092; B01D 2255/2065;
(Continued)

(56) References Cited

U.S. PATENT DOCUMENTS 3,993,572 A  11/1976  Hindin et al.
4,868,149 A   9/1989  Bricker
(Continued)

FOREIGN PATENT DOCUMENTS

EP   0314058 A1   5/1989
EP   0321949 A1   6/1989
(Continued)

OTHER PUBLICATIONS

Yao et al. "Ceria in Automotive Exhaust Catalysts" Journal of Catalysis 86, 254-265 (1984) (Year: 1984).*
(Continued)

*Primary Examiner* — Anthony J Zimmer
*Assistant Examiner* — Syed T Iqbal
(74) *Attorney, Agent, or Firm* — Dickinson Wright PLLC (57) ABSTRACT

An object is to provide a means for suppressing a deterioration in catalytic performance even after being exposed to high temperature exhaust gas containing a phosphorus compound for a long period of time.
An exhaust gas purifying catalyst including palladium supported on cerium-aluminum composite oxide containing cerium at from 3 to 60% by mass in terms of cerium oxide.

7 Claims, 4 Drawing Sheets

(51) Int. Cl.
 *B01J 21/04* (2006.01)
 *F01N 3/10* (2006.01)
 *B01J 37/03* (2006.01)
 *B01J 23/02* (2006.01)
 *B01J 35/10* (2006.01)
 *B01J 35/02* (2006.01)
 *B01J 35/00* (2006.01)
 *B01J 35/04* (2006.01)
 *B01J 23/00* (2006.01)
 *B01J 23/06* (2006.01)
 *B01J 23/10* (2006.01)

(52) U.S. Cl.
 CPC ............ *B01J 21/04* (2013.01); *B01J 23/002* (2013.01); *B01J 23/02* (2013.01); *B01J 23/06* (2013.01); *B01J 23/10* (2013.01); *B01J 23/63* (2013.01); *B01J 35/002* (2013.01); *B01J 35/0006* (2013.01); *B01J 35/023* (2013.01); *B01J 35/04* (2013.01); *B01J 35/1014* (2013.01); *B01J 35/1019* (2013.01); *B01J 37/038* (2013.01); *F01N 3/10* (2013.01); *B01D 2255/1023* (2013.01); *B01D 2255/2065* (2013.01); *B01D 2255/2092* (2013.01); *B01D 2258/01* (2013.01); *Y02T 10/12* (2013.01)

(58) Field of Classification Search
 CPC .......... B01D 2255/1023; B01D 53/945; B01D 53/94; B01J 23/10; B01J 23/06; B01J 21/04; B01J 23/63; B01J 35/1019; B01J 35/1014; B01J 35/04; B01J 35/023; B01J 35/002; B01J 23/02; B01J 23/002; B01J 35/0006; B01J 37/038; Y02T 10/22; F01N 3/10
 See application file for complete search history.

(56) References Cited

U.S. PATENT DOCUMENTS

| | | | |
|---|---|---|---|
| 4,868,150 | A | 9/1989 | Spooner et al. |
| 5,013,705 | A | 5/1991 | Koberstein et al. |
| 5,494,878 | A | 2/1996 | Murakami et al. |
| 5,597,771 | A * | 1/1997 | Hu .................... F01N 3/101 502/304 |
| 6,080,375 | A | 6/2000 | Mussmann et al. |
| 6,150,288 | A | 11/2000 | Suzuki et al. |
| 6,306,794 | B1 | 10/2001 | Suzuki et al. |
| 6,808,687 | B1 | 10/2004 | Uenishi et al. |
| 2006/0217263 | A1 | 9/2006 | Kawamoto et al. |
| 2007/0014705 | A1* | 1/2007 | Franklin Chen ......... B01J 23/63 422/168 |
| 2009/0048102 | A1* | 2/2009 | Matsubara ........... B01D 53/945 502/304 |
| 2010/0111799 | A1 | 5/2010 | Kuma |
| 2013/0345049 | A1 | 12/2013 | Chinzei |
| 2014/0260214 | A1* | 9/2014 | Xue ........................ B01J 37/10 60/299 |
| 2015/0306571 | A1* | 10/2015 | Jung .................. B01D 53/9422 60/299 |

FOREIGN PATENT DOCUMENTS

| | | |
|---|---|---|
| JP | A-S56-130231 | 10/1981 |
| JP | 1989281145 A | 11/1989 |
| JP | H01281145 A | 11/1989 |
| JP | A-H05-168926 | 7/1993 |
| JP | A-H06-226096 | 8/1994 |
| JP | A-H08-038898 | 2/1996 |
| JP | a-H08-131830 | 5/1996 |
| JP | A-H09-000928 | 1/1997 |
| JP | 1997313938 A | 12/1997 |
| JP | 1998174846 A | 6/1998 |
| JP | A-H10-182155 | 7/1998 |
| JP | 1998299085 A | 11/1998 |
| JP | 2002011350 A | 1/2002 |
| JP | A-2006-167540 | 6/2006 |
| JP | 2006297372 A | 11/2006 |
| JP | A-2010-505600 | 2/2010 |
| JP | 2011101842 A | 5/2011 |
| JP | 2011183317 A | 9/2011 |
| JP | 2012187518 A | 10/2012 |
| WO | WO2007/052821 A1 | 5/2007 |

OTHER PUBLICATIONS

Japanese Notice for Reasons for Refusal dated Aug. 20, 2019, which issued in the corresponding Japanese Patent Application No. 2017-511072, including English translation.
Japanese Office Action dated Jan. 15, 2019, which issued in the corresponding Japanease Patent Application No. 2017-511072, including English translation.
International Preliminary Report on Patentability dated Oct. 19, 2017, which issued in the corresponding PCT Patent Application No. PCT/JP2016/061462, including English translation.
Japanese Office Action dated Sep. 4, 2018, which issued in the corresponding Japanese Patent Application No. 2017-511072, including English translation.
Non-Patent Literature: A. Scott et. al., "The Impact of Passenger Car Motor Oil Phosphorus Levels on Automotive Emissions Control Systems," SAE Paper, 961898, (1996), 22 pages.
International Search Report and Written Opinion dated Jul. 12, 2016 which issued in PCT Application No. PCT/JP2016/061462.
Lambrou et al., The effects of Fe on the oxygen storage and release properties of model Pd—Rh/$CeO_2$-$Al_2O_3$ three-way catalyst, Journal of Catalysis 240 (2006) 183-193.
Extended European Search Reort issue for related EP application No. 16 77 6654, dated Feb. 14, 2018.
Chinese Office Action dated Aug. 30, 2019, which issued in the corresponding Chinese Patent Application No. 201680021217.8, including English translation.
Ramirez-Lopez et al., Complete Catalytic Oxidation of Methane Over Pd/CeO2-Al2O3: The Influence of Different Ceria Loading, Catalysis Today 150 (2010) 358-362, pp. 358-362.
Chinese Office Action dated Mar. 18, 2020, which issued in the corresponding Chinese Patent Application No. 201680021217.8, including English translation.
Chinese Office Action dated Aug. 13, 2020, which issued in the corresponding Chinese Patent Application No. 201680021217. 8, including English translation.
Chinese Office Action dated Jan. 27, 2021, which issued in the corresponding Chinese Patent Application No. 201680021217.8, including English translation.

* cited by examiner

Powder (a1)

Powder (k1)

CATALYST FOR PURIFICATION OF EXHAUST GAS FROM INTERNAL COMBUSTION ENGINE AND EXHAUST GAS PURIFYING METHOD USING THE CATALYST

TECHNICAL FIELD

The present invention relates to a catalyst for the purification of exhaust gas from an internal combustion engine and an exhaust gas purifying method using the catalyst. More specifically, the present invention relates to a technique for suppressing a deterioration in performance of palladium under a condition of being exposed to the exhaust gas from an internal combustion engine for a long time.

BACKGROUND ART

The exhaust gas purifying performance is required to be maintained over a long period of time as the regulation of exhaust gas of motor vehicles is strengthened. This means that the demand for a long lifespan, namely, long-term durability of the catalyst as a post treatment apparatus for the purification of exhaust gas is increased. When being exposed to exhaust gas for a long period of time, the purifying performance of the catalyst deteriorates due to the sintering of noble metal particles and the poisoning of noble metal particles by phosphorus contained in the exhaust gas (hereinafter, referred to as the phosphorus poisoning). In order to satisfy the regulation of exhaust gas to be further strengthened in the future, it is an important task to suppress the sintering of noble metal particles and a deterioration in catalytic performance due to the phosphorus poisoning.

Various studies on a method of suppressing the sintering of noble metal particles have been conducted, and for example, it is proposed that palladium can be contained in the layer thickness direction of the catalyst layer with favorable dispersibility and thermal degradation can be thus avoided as the catalyst is equipped with a first catalyst layer that is formed on the surface of the catalyst support and contains palladium and alumina and a second catalyst layer that is formed on the outer surface of the first catalyst layer and contains palladium and ceria (Patent Literature 1).

Catalysts containing platinum group elements and cerium oxide are easily degraded at high temperatures. Hence, it is proposed that the addition of various kinds of barium compounds and zirconium compounds exhibits an effect of suppressing the sintering of platinum group elements and cerium oxide (Patent Literature 2).

Furthermore, it is also proposed that the aggregation of platinum is suppressed and the sintering is suppressed by using a technique including an alumina support, platinum supported on the alumina support, and a cerium oxide layer covering the platinum supported and the alumina support (Patent Literature 3).

Meanwhile, it is known that phosphorus poisoning is caused by deposition and penetration of a phosphorus compound derived from a lubricating oil additive such as a zinc dialkyldithiophosphate contained in the exhaust gas into the catalyst layer. It is known that the catalytic performance deteriorates when this phosphorus poisoning occurs (Non-Patent Literature 1).

It is known that a deterioration in catalytic performance due to phosphorus poisoning is caused by the following phenomena. The inhibition of exhaust gas diffusion in the catalyst layer occurs by the phosphorus compound deposited and penetrated into the catalyst layer. In addition, cerium oxide of the oxygen occluding and releasing material often used in a three-way catalyst reacts with the phosphorus compound to form cerium phosphate. The oxygen occlusion and release hardly occurs when cerium phosphate is formed, and thus the relaxation when the exhaust gas atmosphere is changed to a lean or rich state hardly occurs. The purification rate of exhaust gas decreases as these phenomena occur.

It is disclosed that a deterioration in performance of cerium alone can be decreased by using a composite oxide of ceria with zirconia in a catalyst using palladium in order to suppress the phosphorus poisoning (Patent Literature 4).

CITATION LIST

Patent Literatures

Patent Literature 1: JP 6-226096 A
Patent Literature 2: JP 5-168926 A
Patent Literature 3: JP 8-131830 A
Patent Literature 4: JP 8-38898 A

Non-Patent Literature

Non-Patent Literature 1: A. Scott et. al., SAE Paper, 961898, (1996)

SUMMARY OF INVENTION

Technical Problem

However, when cerium oxide is used as a substrate for supporting palladium as in Patent Literature 1, there is a possibility that cerium oxide is sintered when being exposed to a high temperature since cerium oxide exhibits low heat resistance and palladium supported is thus sintered. In addition, there is a possibility that palladium supported on aluminum oxide is poisoned by phosphorus since there is no element that traps phosphorus.

In addition, in the method of Patent Literature 2, there is a possibility that the dispersion of palladium supported is low and the sintering is likely to occur since the surface area of zirconium is lower than that of aluminum oxide.

Furthermore, in the method of Patent Literature 3, there is a possibility that the exposure of the noble metal decreases as compared to the noble metal supported on the surface of the substrate since the noble metal is covered by the cerium oxide layer, the contact of the noble metal with the exhaust gas is inhibited, and thus the catalytic activity deteriorates.

The method of Patent Literature 4 discloses that the phosphorus poisoning is suppressed as compared to the prior art as the catalytic performance after endurance to phosphorus poisoning is improved by the addition of zirconia as compared to ceria alone of the prior art. The composite oxide containing cerium and zirconium is added as a promoter and palladium is supported on aluminum oxide. Hence, there is a possibility that palladium on aluminum oxide is affected by the phosphorus poisoning since there is no element that traps phosphorus.

Accordingly, an object of the present invention is to suppress the sintering of noble metals and a deterioration in catalytic performance even in the case of being exposed to phosphorus-containing high temperature exhaust gas for a long period of time.

Solution to Problem

The above problem is solved by the following (1) to (9).

(1) An exhaust gas purifying catalyst comprising palladium supported on cerium-aluminum composite oxide containing cerium at from 3 to 60% by mass in terms of cerium oxide.

(2) The exhaust gas purifying catalyst according to said (1), wherein cerium in the cerium-aluminum composite oxide is uniformly dispersed in the cerium-aluminum composite oxide.

(3) The exhaust gas purifying catalyst according to said (1) or (2), wherein a part of palladium supported is aluminum-cerium-palladium composite in X-ray diffraction measurement by CuKα ray after the exhaust gas purifying catalyst is exposed to a high temperature of 1000° C. or higher.

(4) The exhaust gas purifying catalyst according to said (3), wherein the aluminum-cerium-palladium composite is $Al_xCe_yPd_z$' wherein x=9 to 1, y=5 to 1, and z=7 to 1.

(5) The exhaust gas purifying catalyst according to said (3) or (4), wherein the aluminum-cerium-palladium composite is $Al_{5.0}Ce_{1.7}Pd_{3.3}$.

(6) The exhaust gas purifying catalyst according to any one of said (1) to (5), wherein a ratio of a peak intensity located at a diffraction angle 2θ=38.5° to a peak intensity located at 40.2° is from 0.18 to 0.45 in X-ray diffraction measurement by CuKα ray after the exhaust gas purifying catalyst is exposed to a high temperature of 1000° C. or higher.

(7) The exhaust gas purifying catalyst according to any one of said (1) to (6), including at least one kind of platinum or rhodium.

(8) The exhaust gas purifying catalyst according to said (7), wherein a mass ratio of palladium to rhodium is from 0.005 to 40.

(9) The exhaust gas purifying catalyst according to any one of said (1) to (8), wherein a mass ratio of palladium to cerium-aluminum composite oxide is from 0.005 to 50% by mass.

(10) A method of treating exhaust gas, comprising treating exhaust gas containing a phosphorus compound by using the catalyst according to any one of said (1) to (9).

Advantageous Effect of Invention

It is possible to suppress sintering of noble metal particles and to maintain high exhaust gas treatment capacity for a long period of time without deteriorating the performance of the catalyst by using the catalyst of the present invention, even in the case of being exposed to high temperature phosphorus-containing exhaust gas for a long period of time.

DESCRIPTION OF EMBODIMENTS

Hereinafter, preferred embodiments of the present invention will be described, but the technical scope of the present invention should be determined based on the description of the claims and is not limited to the following embodiments.

The exhaust gas purifying catalyst according to the present invention is a catalyst for purifying exhaust gas containing a phosphorus compound, and it contains palladium and rhodium and is formed by supporting palladium on a composite oxide containing cerium oxide at from 3 to 60% by mass per cerium-aluminum composite oxide. The exhaust gas purifying catalyst of the present invention having such a structure exhibits excellent catalytic performance (poisoning resistance) and excellent high temperature durability even after being exposed to exhaust gas containing a phosphorus compound, suppresses sintering of the noble metal, and can efficiently purify the exhaust gas, particularly nitrogen oxide (NOx), carbon monoxide (CO), and hydrocarbons (HC) in the exhaust gas from an internal combustion engine.

<Cerium-Aluminum Composite Oxide>

The Cerium-aluminum composite oxide of the present embodiment is one wherein the cerium is uniformly dispersed in the cerium-aluminum composite oxide on a nanometer order. The term "uniformly dispersed" means that the difference between the maximum and the minimum value for the ratio of cerium at each observation point on the cerium-aluminum composite oxide is within 10% in the line analysis by observation using an electron microscope equipped with an energy dispersive X-ray detector, for example, a TEM-EDX (Energy Dispersive X-ray Spectrum-Transmission Electron Microscope) or a TEM-EDS (Energy Dispersive X-ray Spectroscopy-Transmission Electron Microscope). The ratio of cerium indicates the state to be defined by the following Formula (1).

[Mathematical Formula 1]

$$\text{Ratio of cerium [\%]} = \frac{\text{Ce counts}}{\text{Ce counts} + \text{Al counts}} \times 100 \quad (1)$$

Ce counts indicate the number of counts related to Ce when being measured by a TEM-EDX or a TEM-EDS.

Al counts indicate the number of counts of Al when being measured by a TEM-EDX or a TEM-EDS.

The method of preparing this cerium-aluminum composite oxide is not particularly limited as long as it exhibits the above uniform state, and a method of preparing a composite oxide that can be used in this field can be appropriately employed. For example, various kinds of methods such as a coprecipitation method and a sol-gel method can be used as the method of preparing a composite oxide. Among these, the coprecipitation method is more preferable in order to form uniform cerium-aluminum composite oxide. By using such a preparation method, it is possible to prepare cerium-aluminum composite oxide in which cerium is uniformly dispersed in alumina on a nanometer order.

The starting material (cerium source) of cerium used in these preparation methods is not particularly limited, and raw materials used in this field can be used. Specific examples thereof may include cerium; a halide such as cerium chloride; an inorganic salt such as a cerium nitrate, a cerium sulfate, or an ammonium salt of cerium; a carboxylate such as an acetate; or a hydroxide, an alkoxide, or an oxide. Preferred examples thereof may include a nitrate, an acetate, a sulfate, and a chloride. Among these, a nitrate (cerium nitrate) or a sulfate (cerium sulfate) are more preferable. Incidentally, these cerium sources may be used solely or two or more kinds thereof may be used concurrently.

The starting material (aluminum source) of aluminum used in these preparation methods is not particularly limited, and raw materials used in this field can be used. Specific examples thereof may include aluminum; a halide such as aluminum chloride; an inorganic salt such as an aluminum nitrate, an aluminum sulfate, or an ammonium salt of aluminum; a carboxylate such as an acetate; or a hydroxide, an alkoxide, or an oxide. Preferred examples thereof may include a nitrate, an acetate, a sulfate, or a chloride. Among these, a nitrate (aluminum nitrate) or a sulfate (aluminum sulfate) are more preferable. Incidentally, these aluminum sources may be used singly or two or more kinds thereof may be used concurrently.

Cerium in cerium-aluminum composite oxide is from 3 to 60% by mass, preferably from 5 to 25% by mass, and more preferably from 8 to 20% by mass as cerium oxide. When the content of cerium oxide is 3% or more, the cerium-aluminum composite oxide and palladium supported thereon form aluminum-cerium-palladium composite oxide under a high temperature condition of 800° C. or higher, and thus it is difficult for the palladium particles to move, and it is possible to suppress sintering that palladium particles gather to form a gigantic particle. In addition, when the content is 60% or less, the heat resistance of alumina can be exerted and the heat resistance of cerium-aluminum composite oxide is thus exerted.

The aluminum-cerium-palladium composite oxide may satisfy $Al_xCe_yPd_z$, preferably x=9 to 1, y=5 to 1, and z=7 to 1, more preferably x=5 to 1, y=3 to 1.5, and z=5 to 3, still more preferably x=3 to 1, y=3 to 1.5, and z=5 to 3, and most preferably it is $Al_{5.0}Ce_{1.7}Pd_{3.3}$. It is considered that cerium-aluminum composite oxide forms a bond with palladium and the movement of palladium particles is easily suppressed as aluminum-cerium-palladium composite is formed.

The average particle diameter of cerium-aluminum composite oxide is preferably from 0.5 to 150 µm, more preferably from 1 to 100 µm, and still more preferably from 2 to 50 µm. In addition, the BET specific surface area is preferably from 10 to 300 m$^2$/g and more preferably from 30 to 200 m$^2$/g. The palladium-supporting cerium-aluminum composite oxide is further used by coating on a three-dimensional structure. In this case, the amount of cerium-aluminum composite oxide is not particularly limited, but it is from 5 to 300 g and more preferably from 20 to 200 g per 1 liter of the catalyst in terms of oxide when the exhaust gas purifying catalyst is formed by using a three-dimensional structure.

<Palladium>

In the present invention, palladium functions as a catalyst in a chemical reaction (oxidation and reduction reaction) for purifying a harmful substance. Incidentally, palladium in the present specification means a "palladium element" or a "palladium atom".

The amount of palladium supported is from 0.005 to 50% by mass, more preferably from 0.05 to 50% by mass, and still more preferably from 0.5 to 35% by mass with respect to the cerium-aluminum composite oxide. When the amount is less than 0.005% by mass, a deterioration in catalytic performance by Pd moving is small because the amount of Pd is low. Thus the effect of using the present invention is small. The amount exceeds 50% by mass is not preferable since it is difficult to suppress the Pd moving.

<Inorganic Oxide>

The exhaust gas purifying catalyst of the present invention can use an inorganic oxide used in the exhaust gas purifying catalyst field. For example, it is possible to use a refractory inorganic oxide, an oxide having the oxygen storage capacity as the inorganic oxide.

As the refractory inorganic oxide, an inorganic oxide having a high melting point is preferably used and an inorganic oxide having a melting point of 1000° C. or higher is more preferably used. An inorganic oxide having a melting point of from 1000 to 3000° C. is more preferably used and an inorganic oxide having a melting point of from 1500 to 3000° C. is particularly preferably used. Specific examples thereof may include aluminum oxide ($Al_2O_3$) such as α-alumina or activated alumina such as γ-alumina, δ-alumina, η-alumina, or θ-alumina; silicon oxide ($SiO_2$); titanium oxide (titania) ($TiO_2$); zirconium oxide (zirconia) ($ZrO_2$); phosphorus oxide ($P_2O_5$); phosphate zeolite; or any composite oxide thereof, for example, alumina-titania, alumina-zirconia, or titania-zirconia. Among these, aluminum oxide, zirconium oxide, or silicon oxide are preferable, aluminum oxide or zirconium oxide are more preferable, and aluminum oxide is still more preferable.

In addition, the refractory inorganic oxide may contain a rare earth metal (however, excluding Ce). Examples of the rare earth metal may include lanthanum (La), neodymium (Nd), yttrium (Y), scandium (Sc), or praseodymium (Pr). Among these, lanthanum, neodymium, yttrium, and praseodymium are preferable, and lanthanum or praseodymium are more preferable. Incidentally, these rare earth metals may be contained in the refractory inorganic oxide singly or in combination of two or more kinds thereof. The rare earth metal in the refractory inorganic oxide may be in the form of a metal as it is, in the form of an oxide, or in the form of a composite oxide with the refractory inorganic oxide.

The shape of the refractory inorganic oxide is not particularly limited, but for example, it can be a shape such as a spherical shape, a cubic shape, a spindle shape, a cylindrical shape, a ring shape, a needle shape, or an irregular shape. The particle diameter of the inorganic oxide at this time is preferably from 0.5 to 150 µm, more preferably from 1 to 100 µm, and still more preferably from 2 to 50 µm. In addition, the BET specific surface area of the inorganic oxide is not particularly limited, but it is preferably from 10 to 750 m$^2$/g and more preferably from 30 to 350 m$^2$/g. The amount of the refractory inorganic oxide is not particularly limited, but it is from 5 to 300 g, more preferably from 10 to 200 g, and still more preferably from 20 to 150 g per 1 liter of the catalyst in terms of oxide when the exhaust gas purifying catalyst is formed by using a three-dimensional structure.

In addition, as the oxygen storage material, a rare earth element can be used, and lanthanum, cerium, neodymium, yttrium, or praseodymium can be used, and lanthanum, cerium, or praseodymium is preferable. The rare earth element can be used singly, as a mixture, or as a composite, and it can also be combined with aluminum oxide, silicon oxide, zirconium oxide, titanium oxide, or the like (excluding the combination of cerium with aluminum).

The shape of the oxygen storage material is not particularly limited, but for example, it may be a shape such as a spherical shape, a cubic shape, a spindle shape, a cylindrical shape, a ring shape, a needle shape, or an irregular shape. The particle diameter of the oxygen storage material at this time is preferably from 0.5 to 150 μm, more preferably from 1 to 100 μm, and still more preferably from 2 to 50 μm. The BET specific surface area of the oxygen storage material is not particularly limited, but it is preferably from 10 to 750 $m^2/g$ and more preferably from 30 to 350 $m^2/g$. The amount of the oxygen storage material is not particularly limited, but it is preferably from 5 to 300 g, more preferably from 10 to 200 g, and still more preferably from 20 to 150 g per 1 liter of the catalyst in terms of oxide when the exhaust gas purifying catalyst is formed by using a three-dimensional structure.

The catalyst of the present invention may contain an alkali metal and/or an alkaline earth metal. Here, examples of the alkali metal may include lithium, sodium, potassium, rubidium, or cesium, and potassium is preferable. In addition, examples of the alkaline earth metal may include calcium, strontium, or barium, and barium is preferable. Here, the alkali metal and/or the alkaline earth metal may be blended singly or in the form of a mixture of two or more kinds thereof. The amount of the alkali metal and/or alkaline earth metal used is not particularly limited, but it is preferably from 0.5 to 40 g, more preferably from 1 to 25 g, and still more preferably from 3 to 18 g per 1 liter of the catalyst in terms of oxide when the exhaust gas purifying catalyst is formed by using a three-dimensional structure.

<Exhaust Gas Purifying Catalyst>

The palladium-supporting cerium-aluminum composite oxide of the present invention can be used as an exhaust gas purifying catalyst for purifying a harmful substance in exhaust gas.

The exhaust gas purifying catalyst contains palladium and rhodium as essential catalyst components, and it may contain other noble metals such as platinum if necessary. In addition, palladium and a noble metal other than rhodium can be present in the same layer, but it is preferable that palladium and a noble metal other than palladium are present in separate layers when the catalyst is formed of a plurality of layers. Incidentally, a noble metal other than palladium can be contained as long as it does not promote the movement of palladium or does not inhibit the phosphorus poisoning resistance. It is preferable that palladium and rhodium are present in separate layers particularly when they are used concurrently. It is particularly preferable that 50% or more of the amount of palladium used and 50% or more of the amount of rhodium used are present in separate layers. It is still more preferable that 50% or more of the amount of palladium used is present in the lower layer and 50% or more of the amount of rhodium used is present in the upper layer.

The exhaust gas purifying catalyst may contain an inorganic oxide such as a refractory inorganic oxide or an oxygen storage material, and these noble metals are supported on the inorganic oxide. The amount of the noble metal to the oxide is from 0.005 to 20% by mass, preferably from 0.01 to 15% by mass, more preferably from 0.05 to 10% by mass as the total amount of palladium and rhodium. Furthermore, the supporting amount of the noble metal-supporting inorganic oxide to 1 liter of the three-dimensional structure is from 15 to 350 g, preferably from 30 to 300 g, more preferably from 60 to 250 g. In addition, the mass ratio of palladium to rhodium is from 0.005 to 40, preferably from 0.01 to 35, and more preferably from 0.1 to 30.

<Three-Dimensional Structure>

The three-dimensional structure used in the catalyst of the present invention is not particularly limited, and three-dimensional structures usually used in this field can be used without limitation. Examples of the three-dimensional structure may include a heat resistant support such as a honeycomb support, but monolithically molded honeycomb structure is preferable, and examples thereof may include a monolith honeycomb support, a metal honeycomb support, or a plug honeycomb support. In addition, examples of a support that is not a three-dimensional monolithic structure may include a pellet support.

The monolithic honeycomb support may be those that are usually referred to as a ceramic honeycomb support. In particular, a honeycomb support formed of a material such as cordierite, mullite, α-alumina, zirconia, titania, titanium phosphate, aluminum titanate, betalite, spongemen, aluminosilicate, or magnesium silicate is preferable, and among them, a honeycomb support formed of a cordierite material is particularly preferable. In addition, those that are formed into a monolithic structure by using a heat resistant metal exhibiting oxidation resistance such as stainless steel or Fe—Cr—Al alloy are used. These monolithic supports are manufactured by an extrusion molding method, a method to wind and solidify a sheet-shaped element, or the like. The shape of the gas passage port (cell shape) may be a hexagonal, square, triangular, or corrugated shape. The cell density (number of cells/unit cross-sectional area) is sufficiently usable if the cell density is from 100 to 1000 cells/square inch, and preferably from 400 to 900 cells/square inch.

The structure of the catalyst is not particularly limited, but the catalyst preferably has a structure in which one or more catalyst layers containing the palladium-supporting cerium-aluminum composite oxide are layered on a support. The structure of the catalyst of the present invention is not particularly limited as long as it includes at least one catalyst layer containing palladium-supporting cerium-aluminum composite oxide. The catalyst layer containing the palladium composite particles may be present at any position in the case of forming the structure by layering two or more catalyst layers.

Incidentally, the catalyst of the present invention may contain a catalyst component other than the palladium-supporting cerium-aluminum composite oxide if necessary as long as it contains the palladium-supporting cerium-aluminum composite oxide of the present invention. As the catalyst component other than the palladium-supporting cerium-aluminum composite oxide, for example, it is possible to use catalyst components, which can be used in this field, such as a noble metal such as platinum, an alkali metal, an alkaline earth metal, a rare earth metal, a refractory inorganic oxide, an oxygen storage material, a HC adsorbent, or a NOx adsorbent without limitation.

<Method of Manufacturing Palladium-Supporting Cerium-Aluminum Composite Oxide>

The palladium-supporting cerium-aluminum composite oxide of the present invention can be manufactured by supporting palladium on cerium-aluminum composite oxide. The supporting method used in the manufacturing method of the present embodiment is not particularly limited, and a supporting method that can be used in this field can be appropriately employed. For example, various kinds of methods such as a kneading method, a coprecipitation method, a sol-gel method, an impregnation method, a reverse micelle method, or an ion exchange method can be used as the supporting method. Among these, it is preferable to use a kneading method, a coprecipitation method, or an impregnation method and it is more preferable to use a kneading method or a coprecipitation method from the viewpoint of forming aluminum-cerium-palladium composite. By using such a supporting method, it is possible to support palladium on cerium-aluminum composite oxide.

The starting material (palladium source) of palladium used in these supporting methods is not particularly limited, and the raw materials used in this field can be used. Specific examples thereof may include metallic palladium; a halide such as palladium chloride; an inorganic salt such as a palladium nitrate, a palladium sulfate, an ammonium salt of palladium, an amine salt of palladium, or a tetraammine salt of palladium; a palladium carboxylate such as an acetate; or a hydroxide, an alkoxide, or an oxide. Preferred examples thereof may include a nitrate, an acetate, an ammonium salt, an amine salt, a tetraammine salt, a chloride, or a carbonate. Among these, a nitrate (palladium nitrate), a chloride (palladium chloride), an acetate (palladium acetate), or a tetraammine salt (tetraammine palladium) are preferable, and palladium nitrate is more preferable. These palladium sources may be used singly or two or more kinds thereof may be used concurrently.

The aqueous medium used in the manufacturing method described above is not particularly limited, and an aqueous medium to be usually used in this field is used in the same manner. Specific examples thereof may include water, cyclohexanol, a lower alcohol such as methanol, ethanol, or 2-propanol, or an organic alkaline aqueous solution. Water or a lower alcohol is preferably used, and water is particularly preferably used.

The palladium-supporting cerium-aluminum composite oxide thus obtained is calcined after being dried at a temperature of, for example, from 50 to 250° C. and preferably from 100 to 200° C. for from 1 minute to 10 hours and preferably from 5 minutes to 5 hours. The calcination is usually conducted at a temperature of from 300 to 700° C. and preferably from 350 to 600° C. for from 5 minutes to 10 hours and preferably from 10 minutes to 5 hours.

<Method of Manufacturing Exhaust Gas Purifying Catalyst>

Hereinafter, a method of manufacturing the catalyst of the present invention will be described. The method of manufacturing the catalyst of the present invention is not particularly limited, and the catalyst can be manufactured by appropriately referring to conventionally known knowledge. According to one embodiment of the method of manufacturing a catalyst used in this field, first, dispersion solution of the palladium-supporting cerium-aluminum composite oxide of the present invention is obtained by dispersing palladium-supporting cerium-aluminum composite oxide into a suitable aqueous medium. Thereafter, a three-dimensional structure (for example, a honeycomb support) is immersed into the dispersion solution, the excessive dispersion solution is removed from the three-dimensional structure, and the three-dimensional structure is then dried and calcined. Through the above steps, it is possible to manufacture a catalyst in which a catalyst layer containing palladium-supporting cerium-aluminum composite oxide is formed on a three-dimensional structure. Incidentally, it is possible to immerse the three-dimensional structure into the dispersion solution of palladium-supporting cerium-aluminum composite oxide, to remove the excessive dispersion solution from the three-dimensional structure, and to dry and calcine the three-dimensional structure without drying and calcining the palladium-supporting cerium-aluminum composite oxide. In addition, as long as palladium is supported on cerium-aluminum composite oxide, the dispersion solution may contain catalyst components other than the palladium-supporting cerium-aluminum composite oxide of the present invention, for example, a noble metal, an alkali metal, an alkaline earth metal, a rare earth metal, a refractory inorganic oxide, an oxygen storage material, a HC adsorbent, and a NOx adsorbent.

The aqueous medium used in the manufacturing method described above is not particularly limited, and an aqueous medium to be usually used in this field is used in the same manner. Specific examples thereof may include water, cyclohexanol, a lower alcohol such as methanol, ethanol, or 2-propanol, and an organic alkaline aqueous solution. Water or a lower alcohol is preferably used, or water is particularly preferably used.

The dispersion solution may be wet pulverized if necessary. Wet pulverization is usually conducted by a known method, and a ball mill or the like is preferably used although it is not particularly limited. Alternatively, a conventionally known means such as a homogenizer, an ultrasonic dispersion device, a sand mill, a jet mill, or a bead mill may be used.

Thereafter, a three-dimensional structure is put and immersed into the dispersion solution prepared as described above. Thereafter, the three-dimensional structure is withdrawn from the slurry and the excessive slurry is removed from the three-dimensional structure. Thereafter, the three-dimensional structure is dried at from 50 to 250° C. and preferably from 100 to 200° C. for from 1 minute to 10 hours and preferably from 5 minutes to 5 hour and further calcined at a temperature of from 300 to 700° C. and preferably from 350 to 600° C. for from 5 minutes to 10 hours and preferably from 10 minutes to 5 hours, thereby obtaining a catalyst in which a catalyst layer containing palladium composite particles is formed on a three-dimensional structure.

In the case of forming a plurality of catalyst component layers, another noble metal-supporting inorganic oxide-containing slurry is further covered on the palladium-supporting cerium-aluminum composite oxide layer by the same method.

<Exhaust Gas Purifying Method>

The exhaust gas purifying catalyst of the present invention is used in the purification of phosphorus-containing exhaust gas to be discharged from an internal combustion engine or the like. The exhaust gas purifying catalyst has high purification capacity even in a state in which a phosphorus compound is accumulated in the catalyst as phosphorus oxide ($P_2O_5$) at preferably from 1 g to 30 g, more preferably from 1 g to 15 g, and most preferably from 1 g to 10 g per 1 liter of the three-dimensional structure. A state containing 1 g or more is a state that can occur after long-term use and it is thus required to assume 1 g or more for the improvement of long-term durability. Meanwhile, it is not taken into consideration that the phosphorus compound is accumulated in an amount of more than 30 g since it is an oil system or engine combustion abnormality and a state that cannot occur in normal operation. In particular, when palladium is supported on cerium-aluminum composite oxide under a high temperature condition of 800° C. or higher, the catalyst of the present embodiment can maintain excellent catalytic performance as the cerium-aluminum composite oxide comes in contact with palladium to partly form $Al_{5.0}Ce_{1.7}Pd_{3.3}$ and sintering of the palladium particles is suppressed. In other words, the present invention also provides an exhaust gas purifying method that includes exposing the exhaust gas purifying catalyst described above to phosphorus-containing exhaust gas at 800° C. or higher.

Incidentally, the term "to be exposed to exhaust gas" in the present specification means to bring the exhaust gas purifying catalyst into contact with the exhaust gas. It includes not only a case in which the entire part of the catalyst surface is brought into contact with the exhaust gas but also a case in which a part of the catalyst surface is brought into contact with the exhaust gas.

The exhaust gas used in the exhaust gas purifying method of the present invention is not particularly limited as long as it is exhaust gas discharged from an internal combustion engine or the like. Examples thereof may include exhaust gas containing nitrogen oxides (for example, NO, $NO_2$, or $N_2O$), carbon monoxide, carbon dioxide, oxygen, hydrogen, ammonia, water, sulfur dioxide, or hydrocarbons.

The effect of the present invention (namely, the effect of suppressing sintering of palladium particles under a high temperature condition) can be sufficiently exerted when the temperature of exhaust gas is 800° C. or higher, but the effect of the present invention can be more remarkably exerted when the temperature of exhaust gas is higher. Specifically, the temperature of exhaust gas is preferably 900° C. or higher, more preferably 950° C. or higher, and still more preferably 1000° C. or higher.

In addition, in the exhaust gas purifying method of the present invention, an exhaust gas purifying catalyst that is the same as or different from the exhaust gas purifying catalyst of the present invention may be disposed in the former stage (inflow side) or the latter stage (outflow side) of the exhaust gas purifying catalyst of the present invention.

EXAMPLES

The effect of the present invention will be described with reference to the following Examples and Comparative Examples. However, the technical scope of the present invention is not limited to only the following Examples.

Example 1

Figure 1:
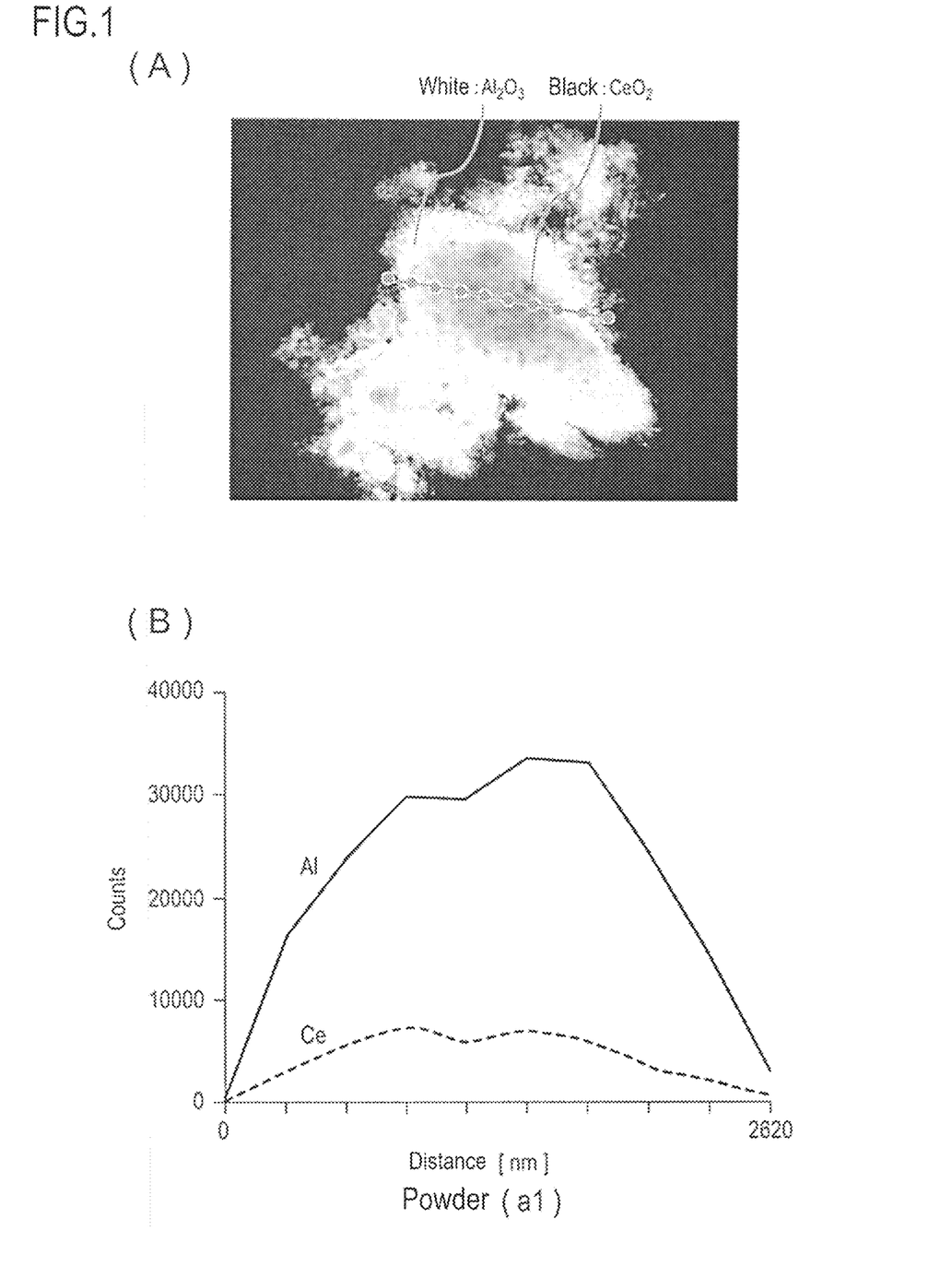
FIG. 1(A) is a diagram illustrating a composite oxide particle image of cerium-aluminum composite oxide used in Example 1 of the present invention in the TEM-EDS measurement and FIG. 1(B) is a diagram illustrating the line analysis results of the composite oxide.

An aqueous solution of palladium nitrate and a powder (a1) of cerium-aluminum composite oxide ($CeO_2:Al_2O_3$=8:92, the same applies hereinafter) having an average particle diameter of 18.5 μm (BET specific surface area 100 m$^2$/g) were each weighed such that the mass ratio of palladium (Pd):a1 was 4.024:31. Here, as the powder (a1) of cerium-aluminum composite oxide, one that was confirmed that cerium was uniformly dispersed in cerium-aluminum composite oxide as illustrated in FIG. 1 and Table 1 was used.

The aqueous solution of palladium nitrate was supported on the powder (a1) by a kneading method, dried at 120° C. for 12 hours, and then air-calcined at 500° C. for 1 hour, thereby fabricating a powder (a2) of palladium-supporting cerium-aluminum composite oxide. The powder (a2) after being subjected to the endurance treatment in the air at 1000° C. for 10 hours was subjected to the XRD measurement, and as a result, $Al_{5.0}Ce_{1.7}Pd_{3.3}$ was detected. $Al_{5.0}Ce_{1.7}Pd_{3.3}$ has a peak at the angle presented in the JCPDS file 00-047-1610. Next, the powder (a2), $CeO_2$—$ZrO_2$ composite oxide having an average particle diameter of 2.0 μm, aluminum oxide having an average particle diameter of 38 μm, and barium hydroxide were weighed such that a2:$CeO_2$—$ZrO_2$ composite oxide:aluminum oxide:barium oxide (BaO) was 54.024:31:15.94:10.06 and the mixture was wet pulverized by using a ball mill, thereby fabricating a slurry (a3). The slurry (a3) thus fabricated was washcoated on 0.8 liter of a cordierite support having a cell density of 600 cells/square inch in an amount that the sum of the respective components was 111.024 g/liter (hereinafter, the weight per 1 liter of cordierite support is denoted as "g/liter"), dried at 150° C. for 15 minutes, and then calcined at 500° C. for 1 hour.

Next, an aqueous solution of rhodium nitrate, an aqueous solution of palladium nitrate, $CeO_2$—$ZrO_2$ composite oxide having an average particle diameter of 4.3 μm (BET specific surface area 82 m$^2$/g), and aluminum oxide having an average particle diameter of 38 μm were each weighed such that the mass ratio of rhodium (Rh):palladium (Pd):$CeO_2$—$ZrO_2$ composite oxide:aluminum oxide was 0.36:0.216:48.7:34.7, and the mixture was wet pulverized by using a ball mill, thereby fabricating a slurry (a4). The slurry (a4) thus fabricated was washcoated on the cordierite support that was previously coated with the slurry (a3) in an amount that the sum of the respective components was 83.976 g/liter, dried at 150° C. for 15 minutes, and then calcined at 500° C. for 1 hour, thereby obtaining a catalyst A coated with 4.24 g/liter of palladium and 0.36 g/liter of rhodium.

Comparative Example 1

An aqueous solution of palladium nitrate and aluminum oxide having an average particle diameter of 38 μm were each weighed such that the mass ratio of palladium (Pd): aluminum oxide was 4.024:50.

The aqueous solution of palladium nitrate was supported on the aluminum oxide by a kneading method, dried at 120 C for 12 hours, and then air-calcined at 500 C for 1 hour, thereby fabricating a powder (b1) of palladium-supporting aluminum oxide. The powder (b1) after being subjected to the endurance treatment in the air at 1000 C for 10 hours was subjected to the XRD measurement, and as a result, $Al_{5.0}Ce_{1.7}Pd_{3.3}$ was not detected.

Next, the powder (b1), $CeO_2$—$ZrO_2$ composite oxide having an average particle diameter of 2.0 μm, aluminum oxide having an average particle diameter of 38 μm, and barium hydroxide were weighed such that b1:$CeO_2$—$ZrO_3$ composite oxide:aluminum oxide:barium oxide (BaO) was 54.024:31:15.94:10.06 and the mixture was wet pulverized by using a ball mill, thereby fabricating a slurry (b2). The slurry (b2) thus fabricated was washcoated on 0.8 liter of a cordierite support having a cell density of 600 cells/square inch in an amount that the sum of the respective components was 111.024 g/liter, dried at 150° C. for 15 minutes, and then calcined at 500° C. for 1 hour.

Next, an aqueous solution of rhodium nitrate, an aqueous solution of palladium nitrate, $CeO_2$—$ZrO_2$ composite oxide having an average particle diameter of 4.3 μm (BET specific surface area 82 m$^2$/g), and aluminum oxide having an average particle diameter of 38 μm were each weighed such that the mass ratio of rhodium (Rh):palladium (Pd):$CeO_2$—$ZrO_2$ composite oxide:aluminum oxide was 0.36:0.216:48.7:34.7, and the mixture was wet pulverized by using a ball mill, thereby fabricating a slurry (b3). The slurry (b3) thus fabricated was washcoated on the cordierite support that was previously coated with the slurry (b2) in an amount that the sum of the respective components was 83.976 g/liter, dried at 150° C. for 15 minutes, and then calcined at 500° C. for 1 hour, thereby obtaining a catalyst B coated with 4.24 g/liter of palladium and 0.36 g/liter of rhodium.

Example 2

An aqueous solution of palladium nitrate and cerium-aluminum composite oxide ($CeO_2:Al_2O_3$=3:97, the same applies hereinafter) having an average particle diameter of 59 µm (BET specific surface area 108 m²/g) were each weighed such that the mass ratio of palladium (Pd):cerium-aluminum composite oxide was 4:80.

The aqueous solution of palladium nitrate was supported on the cerium-aluminum composite oxide by a kneading method, dried at 120° C. for 12 hours, and then air-calcined at 500° C. for 1 hour, thereby fabricating a powder (c1) of palladium-supporting cerium-aluminum composite oxide. The powder (c1) after being subjected to the endurance treatment in the air at 1000° C. for 10 hours was subjected to the XRD measurement, and as a result, $Al_{5.0}Ce_{1.7}Pd_{3.3}$ was detected.

The powder (c1), $CeO_2$—$ZrO_2$ composite oxide having an average particle diameter of 2.0 µm, and barium sulfate were weighed such that c1:$CeO_2$—$ZrO_2$ composite oxide: barium oxide (BaO) was 84:20:10 and the mixture was wet pulverized by using a ball mill, thereby fabricating a slurry (c2). The slurry (c2) thus fabricated was washcoated on 0.0303 liter of a cordierite support having a cell density of 400 cells/square inch in an amount that the sum of the respective components was 114 g/liter, dried at 150° C. for 15 minutes, and then calcined at 500° C. for 1 hour.

Next, an aqueous solution of rhodium nitrate, $CeO_2$—$ZrO_2$ composite oxide having an average particle diameter of 2.1 µm, and aluminum oxide having an average particle diameter of 38 µm were each weighed such that the mass ratio of rhodium (Rh):$CeO_2$—$ZrO_2$ composite oxide:aluminum oxide was 0.3:40:40, and the mixture was wet pulverized by using a ball mill, thereby fabricating a slurry (c3). The slurry (c3) thus fabricated was washcoated on the cordierite support that was previously coated with the slurry (c2) in an amount that the sum of the respective components was 80.3 g/liter, dried at 150° C. for 15 minutes, and then calcined at 500° C. for 1 hour, thereby obtaining a catalyst C coated with 4 g/liter of palladium and 0.3 g/liter of rhodium.

Example 3

An aqueous solution of palladium nitrate and cerium-aluminum composite oxide ($CeO_2$:$Al_2O_3$=5:95, the same applies hereinafter) having an average particle diameter of 59 µm (BET specific surface area 108 m²/g) were each weighed such that the mass ratio of palladium (Pd):cerium-aluminum composite oxide was 4:80.

The aqueous solution of palladium nitrate was supported on the cerium-aluminum composite oxide by a kneading method, dried at 120° C. for 12 hours, and then air-calcined at 500° C. for 1 hour, thereby fabricating a powder (d1) of palladium-supporting cerium-aluminum composite oxide. The powder (d1) after being subjected to the endurance treatment in the air at 1000° C. for 10 hours was subjected to the XRD measurement, and as a result, $Al_{5.0}Ce_{1.7}Pd_{3.3}$ was detected.

The powder (d1), $CeO_2$—$ZrO_2$ composite oxide having an average particle diameter of 2.0 µm, and barium sulfate were weighed such that d1:$CeO_2$—$ZrO_2$ composite oxide: barium oxide (BaO) was 84:20:10 and the mixture was wet pulverized by using a ball mill, thereby fabricating a slurry (d2). The slurry (d2) thus fabricated was washcoated on 0.0303 liter of a cordierite support having a cell density of 400 cells/square inch in an amount that the sum of the respective components was 114 g/liter, dried at 150° C. for 15 minutes, and then calcined at 500° C. for 1 hour.

Next, an aqueous solution of rhodium nitrate, $CeO_2$—$ZrO_2$ composite oxide having an average particle diameter of 2.1 µm, and aluminum oxide having an average particle diameter of 38 µm were each weighed such that the mass ratio of rhodium (Rh):$CeO_2$—$ZrO_2$ composite oxide:aluminum oxide was 0.3:40:40, and the mixture was wet pulverized by using a ball mill, thereby fabricating a slurry (d3). The slurry (d3) thus fabricated was washcoated on the cordierite support that was previously coated with the slurry (d2) in an amount that the sum of the respective components was 80.3 g/liter, dried at 150° C. for 15 minutes, and then calcined at 500° C. for 1 hour, thereby obtaining a catalyst D coated with 4 g/liter of palladium and 0.3 g/liter of rhodium.

Example 4

An aqueous solution of palladium nitrate and cerium-aluminum composite oxide ($CeO_2$:$Al_2O_3$=10:90, the same applies hereinafter) having an average particle diameter of 52 µm (BET specific surface area 114 m²/g) were each weighed such that the mass ratio of palladium (Pd):cerium-aluminum composite oxide was 4:80.

The aqueous solution of palladium nitrate was supported on the cerium-aluminum composite oxide by a kneading method, dried at 120° C. for 12 hours, and then air-calcined at 500° C. for 1 hour, thereby fabricating a powder (e1) of palladium-supporting cerium-aluminum composite oxide. The powder (e1) after being subjected to the endurance treatment in the air at 1000° C. for 10 hours was subjected to the XRD measurement, and as a result, $Al_{5.0}Ce_{1.7}Pd_{3.3}$ was detected.

The powder (e1), $CeO_2$—$ZrO_2$ composite oxide having an average particle diameter of 2.0 µm, and barium sulfate were weighed such that e1:$CeO_2$—$ZrO_2$ composite oxide: barium oxide (BaO) was 84:20:10 and the mixture was wet pulverized by using a ball mill, thereby fabricating a slurry (e2). The slurry (e2) thus fabricated was washcoated on 0.0303 liter of a cordierite support having a cell density of 400 cells/square inch in an amount that the sum of the respective components was 114 g/liter, dried at 150° C. for 15 minutes, and then calcined at 500° C. for 1 hour.

Next, an aqueous solution of rhodium nitrate, $CeO_2$—$ZrO_2$ composite oxide having an average particle diameter of 2.1 µm, and aluminum oxide having an average particle diameter of 38 µm were each weighed such that the mass ratio of rhodium (Rh):$CeO_2$—$ZrO_2$ composite oxide:aluminum oxide was 0.3:40:40, and the mixture was wet pulverized by using a ball mill, thereby fabricating a slurry (e3). The slurry (e3) thus fabricated was washcoated on the cordierite support that was previously coated with the slurry (e2) in an amount that the sum of the respective components was 80.3 g/liter, dried at 150° C. for 15 minutes, and then calcined at 500° C. for 1 hour, thereby obtaining a catalyst E coated with 4 g/liter of palladium and 0.3 g/liter of rhodium.

Example 5

An aqueous solution of palladium nitrate and cerium-aluminum composite oxide ($CeO_2$:$Al_2O_3$=20:80, the same applies hereinafter) having an average particle diameter of 32 µm (BET specific surface area 121 m²/g) were each weighed such that the mass ratio of palladium (Pd):cerium-aluminum composite oxide was 4:80.

The aqueous solution of palladium nitrate was supported on the cerium-aluminum composite oxide by a kneading method, dried at 120° C. for 12 hours, and then air-calcined at 500° C. for 1 hour, thereby fabricating a powder (f1) of palladium-supporting cerium-aluminum composite oxide.

The powder (f1) after being subjected to the endurance treatment in the air at 1000° C. for 10 hours was subjected to the XRD measurement, and as a result, $Al_{5.0}Ce_{1.7}Pd_{3.3}$ was detected.

The powder (f1), $CeO_2$—$ZrO_2$ composite oxide having an average particle diameter of 2.0 μm, and barium sulfate were weighed such that f1:$CeO_2$—$ZrO_2$ composite oxide:barium oxide (BaO) was 84:20:10 and the mixture was wet pulverized by using a ball mill, thereby fabricating a slurry (f2). The slurry (f2) thus fabricated was washcoated on 0.0303 liter of a cordierite support having a cell density of 400 cells/square inch in an amount that the sum of the respective components was 114 g/liter, dried at 150° C. for 15 minutes, and then calcined at 500° C. for 1 hour.

Next, an aqueous solution of rhodium nitrate, $CeO_2$—$ZrO_2$ composite oxide having an average particle diameter of 2.1 μm, and aluminum oxide having an average particle diameter of 38 μm were each weighed such that the mass ratio of rhodium (Rh):$CeO_2$—$ZrO_2$ composite oxide:aluminum oxide was 0.3:40:40, and the mixture was wet pulverized by using a ball mill, thereby fabricating a slurry (f3). The slurry (f3) thus fabricated was washcoated on the cordierite support that was previously coated with the slurry (f2) in an amount that the sum of the respective components was 80.3 g/liter, dried at 150° C. for 15 minutes, and then calcined at 500° C. for 1 hour, thereby obtaining a catalyst F coated with 4 g/liter of palladium and 0.3 g/liter of rhodium.

Example 6

An aqueous solution of palladium nitrate and cerium-aluminum composite oxide ($CeO_2$:$Al_2O_3$=25:75, the same applies hereinafter) having an average particle diameter of 32 μm (BET specific surface area 120 m²/g) were each weighed such that the mass ratio of palladium (Pd):cerium-aluminum composite oxide was 4:80.

The aqueous solution of palladium nitrate was supported on the cerium-aluminum composite oxide by a kneading method, dried at 120° C. for 12 hours, and then air-calcined at 500° C. for 1 hour, thereby fabricating a powder (g1) of palladium-supporting cerium-aluminum composite oxide. The powder (g1) after being subjected to the endurance treatment in the air at 1000° C. for 10 hours was subjected to the XRD measurement, and as a result, $Al_{5.0}Ce_{1.7}Pd_{3.3}$ was detected.

The powder (g1), $CeO_2$—$ZrO_2$ composite oxide having an average particle diameter of 2.0 μm, and barium sulfate were weighed such that g1:$CeO_2$—$ZrO_2$ composite oxide:barium oxide (BaO) was 84:20:10 and the mixture was wet pulverized by using a ball mill, thereby fabricating a slurry (g2). The slurry (g2) thus fabricated was washcoated on 0.0303 liter of a cordierite support having a cell density of 400 cells/square inch in an amount that the sum of the respective components was 114 g/liter, dried at 150° C. for 15 minutes, and then calcined at 500° C. for 1 hour.

Next, an aqueous solution of rhodium nitrate, $CeO_2$—$ZrO_2$ composite oxide having an average particle diameter of 2.1 μm, and aluminum oxide having an average particle diameter of 38 μm were each weighed such that the mass ratio of rhodium (Rh):$CeO_2$—$ZrO_2$ composite oxide:aluminum oxide was 0.3:40:40, and the mixture was wet pulverized by using a ball mill, thereby fabricating a slurry (g3). The slurry (g3) thus fabricated was washcoated on the cordierite support that was previously coated with the slurry (g2) in an amount that the sum of the respective components was 80.3 g/liter, dried at 150° C. for 15 minutes, and then calcined at 500° C. for 1 hour, thereby obtaining a catalyst G coated with 4 g/liter of palladium and 0.3 g/liter of rhodium.

Example 7

An aqueous solution of palladium nitrate and cerium-aluminum composite oxide ($CeO_2$:$Al_2O_3$=60:40, the same applies hereinafter) having an average particle diameter of 7.3 μm (BET specific surface area 121 m²/g) were each weighed such that the mass ratio of palladium (Pd):cerium-aluminum composite oxide was 4:80.

The aqueous solution of palladium nitrate was supported on the cerium-aluminum composite oxide by a kneading method, dried at 120° C. for 12 hours, and then air-calcined at 500° C. for 1 hour, thereby fabricating a powder (h1) of palladium-supporting cerium-aluminum composite oxide. The powder (h1) after being subjected to the endurance treatment in the air at 1000° C. for 10 hours was subjected to the XRD measurement, and as a result, $Al_{5.0}Ce_{1.7}Pd_{3.3}$ was detected.

The powder (h1), $CeO_2$—$ZrO_2$ composite oxide having an average particle diameter of 2.0 μm, and barium sulfate were weighed such that h1:$CeO_2$—$ZrO_2$ composite oxide:barium oxide (BaO) was 84:20:10 and the mixture was wet pulverized by using a ball mill, thereby fabricating a slurry (h2). The slurry (h2) thus fabricated was washcoated on 0.0303 liter of a cordierite support having a cell density of 400 cells/square inch in an amount that the sum of the respective components was 114 g/liter, dried at 150° C. for 15 minutes, and then calcined at 500° C. for 1 hour.

Next, an aqueous solution of rhodium nitrate, $CeO_2$—$ZrO_2$ composite oxide having an average particle diameter of 2.1 μm, and aluminum oxide having an average particle diameter of 38 m were each weighed such that the mass ratio of rhodium (Rh):$CeO_2$—$ZrO_2$ composite oxide:aluminum oxide was 0.3:40:40, and the mixture was wet pulverized by using a ball mill, thereby fabricating a slurry (h3). The slurry (h3) thus fabricated was washcoated on the cordierite support that was previously coated with the slurry (h2) in an amount that the sum of the respective components was 80.3 g/liter, dried at 150° C. for 15 minutes, and then calcined at 500° C. for 1 hour, thereby obtaining a catalyst H coated with 4 g/liter of palladium and 0.3 g/liter of rhodium.

Comparative Example 2

An aqueous solution of palladium nitrate and aluminum oxide having an average particle diameter of 38 μm were each weighed such that the mass ratio of palladium (Pd):aluminum oxide was 4:80.

The aqueous solution of palladium nitrate was supported on the aluminum oxide by a kneading method, dried at 120° C. for 12 hours, and then air-calcined at 500° C. for 1 hour, thereby fabricating a powder (i1) of palladium-supporting aluminum oxide. The powder (i1) after being subjected to the endurance treatment in the air at 1000° C. for 10 hours was subjected to the XRD measurement, and as a result, $Al_{5.0}Ce_{1.7}Pd_{3.3}$ was not detected.

The powder (i1), $CeO_2$—$ZrO_2$ composite oxide having an average particle diameter of 2.0 mm, and barium sulfate were weighed such that i1: $CeO_2$—$ZrO_2$ composite oxide:barium oxide (BaO) was 84:20:10 and the mixture was wet pulverized by using a ball mill, thereby fabricating a slurry (i2). The slurry (i2) thus fabricated was washcoated on 0.0303 liter of a cordierite support having a cell density of 400 cells/square inch in an amount that the sum of the respective components was 114 g/liter, dried at 150 C for 15 minutes, and then calcined at 500 C for 1 hour.

Next, an aqueous solution of rhodium nitrate, $CeO_2$—$ZrO_2$ composite oxide having an average particle diameter of 2.1 μm, and aluminum oxide having an average particle diameter of 38 μm were each weighed such that the mass ratio of rhodium (Rh):$CeO_2$—$ZrO_2$ composite oxide:aluminum oxide was 0.3:40:40, and the mixture was wet pulverized by using a ball mill, thereby fabricating a slurry (i3). The slurry (i3) thus fabricated was washcoated on the cordierite support that was previously coated with the slurry (i2) in an amount that the sum of the respective components was 80.3 g/liter, dried at 150° C. for 15 minutes, and then calcined at 500° C. for 1 hour, thereby obtaining a catalyst I coated with 4 g/liter of palladium and 0.3 g/liter of rhodium.

Comparative Example 3

An aqueous solution of palladium nitrate and cerium oxide were each weighed such that the mass ratio of palladium (Pd):cerium oxide was 4:80.

The aqueous solution of palladium nitrate was supported on the cerium oxide by a kneading method, dried at 120° C. for 12 hours, and then air-calcined at 500° C. for 1 hour, thereby fabricating a powder (j1) of palladium-supporting cerium oxide. The powder (j1) after being subjected to the endurance treatment in the air at 1000° C. for 10 hours was subjected to the XRD measurement, and as a result, $Al_{5.0}Ce_{1.7}Pd_{3.3}$ was not detected.

The powder (j1), $CeO_2$—$ZrO_2$ composite oxide having an average particle diameter of 2.0 mm, and barium sulfate were weighed such that j1: $CeO_2$—$ZrO_2$ composite oxide: barium oxide (BaO) was 84:20:10 and the rest raw materials were wet pulverized by using a ball mill, thereby fabricating a slurry (j2). The slurry (j2) thus fabricated was washcoated on 0.0303 liter of a cordierite support having a cell density of 400 cells/square inch in an amount that the sum of the respective components was 114 g/liter, dried at 150 C for 15 minutes, and then calcined at 500 C for 1 hour.

Next, an aqueous solution of rhodium nitrate, $CeO_2$—$ZrO_2$ composite oxide having an average particle diameter of 2.1 μm, and aluminum oxide having an average particle diameter of 38 μm were each weighed such that the mass ratio of rhodium (Rh):$CeO_2$—$ZrO_2$ composite oxide:aluminum oxide was 0.3:40:40, and the mixture was wet pulverized by using a ball mill, thereby fabricating a slurry (j3). The slurry (j3) thus fabricated was washcoated on the cordierite support that was previously coated with the slurry (j2) in an amount that the sum of the respective components was 80.3 g/liter, dried at 150° C. for 15 minutes, and then calcined at 500° C. for 1 hour, thereby obtaining a catalyst J coated with 4 g/liter of palladium and 0.3 g/liter of rhodium.

Comparative Example 4

Figure 2:
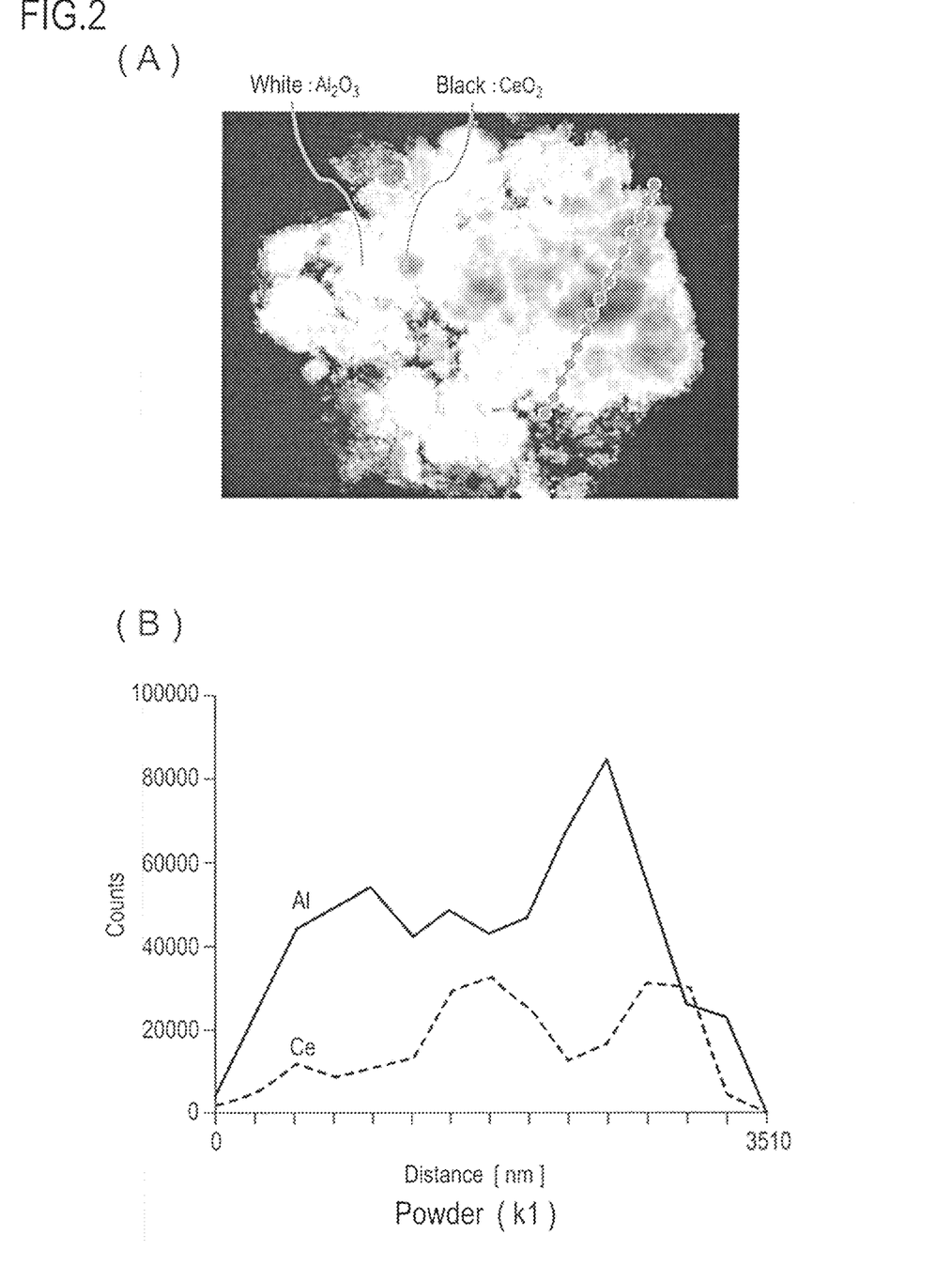
FIG. 2(A) is a diagram illustrating powder particles of a cerium oxide-supporting aluminum oxide powder of Comparative Example 4 in the TEM-EDS measurement and FIG. 2(B) is a diagram illustrating the line analysis results of the mixture.

Aluminum oxide and cerium nitrate were each weighed such that the mass ratio of aluminum oxide:cerium oxide was 92:8. The cerium nitrate was supported on the aluminum oxide by a kneading method, dried at 120° C. for 12 hours, and then calcined at 500° C. for 1 hour, thereby fabricating a powder (k1) of cerium oxide-supporting aluminum oxide. Here, it has been confirmed that cerium is not uniformly dispersed in the cerium-aluminum composite oxide in the powder (k1) of cerium-aluminum composite oxide as illustrated in FIG. 2 and Table 1. The catalyst K fabricated in the same manner as the fabrication of the catalyst A except that the powder (a1) was changed to the powder (k1) exhibits lower exhaust gas purifying performance than the catalyst A.

<Heat Resistance and Phosphorus Poisoning Treatment>

The catalysts A and C to H obtained in Examples 1 to 7 and the catalysts B, I, and J obtained in Comparative Examples 1 to 3 were each installed to the position at 25 cm on the downstream side from the exhaust port of a V-type 6-cylinder 3.0-liter engine and subjected to the heat resistance treatment by using engine oil having a phosphorus (P) concentration of 3000 ppm in the engine oil. At this time, the temperature at the catalyst bed portion was 1000° C. In addition, a cycle to operate the engine at an A/F of the catalyst inlet portion at the time of heat resistance of 14.6 for 25 seconds, subsequently for 2.5 seconds while stopping the fuel supply, and subsequently at an A/F of 12.0 for 2.5 seconds was repeated, thereby operating the engine for 40 hours in total. The amount of phosphorus deposited on the catalyst was about 3.5 g per 1 liter of the three-dimensional structure.

<Uniformity of Cerium-Aluminum Composite Oxide>

In the TEM-EDS measurement (FIG. 1(A) and FIG. 2(A)) of cerium-aluminum composite oxide (powder a1) used in Example 1 and cerium oxide-supporting aluminum oxide (powder k1), line analysis of each particle was conducted and the results obtained by plotting the EDS spectral intensities of cerium and aluminum to the distance are illustrated in FIG. 1(B) and FIG. 2(B). The maximum value and minimum value of the ratio of cerium at each observation point calculated by Formula (1) and the difference between the maximum value and the minimum value are presented in Table 1.

TABLE 1

|  | Maximum value | Minimum value | Difference between maximum value and minimum value |
|---|---|---|---|
| Powder (a1) | 19.6 | 11.8 | 7.8 |
| Powder (k1) | 53.5 | 15.0 | 38.5 |

<XRD Peak Intensity>

The catalyst A obtained in Example 1 and the catalyst B obtained in Comparative Example 1 were subjected to the heat resistance treatment described above and then to the X-ray diffraction measurement (XRD) by CuKα ray to measure the intensity of peak attributed to palladium. X'Pert PRO manufactured by Spectris was used as the XRD apparatus. The measurement was conducted at an X-ray output generated at 40 mA and 45 kV and a step angle of 0.017°.

Figure 3:
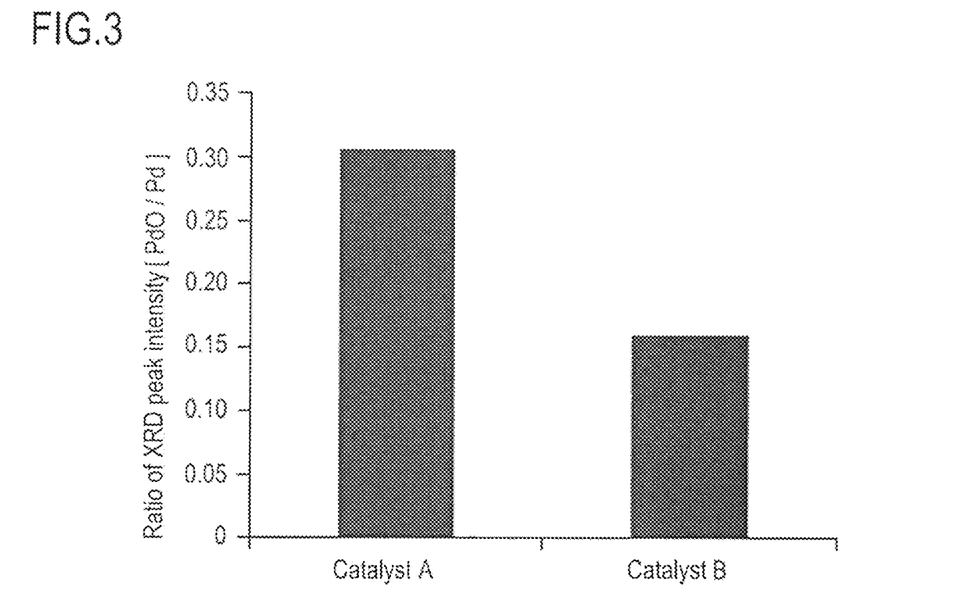
FIG. 3 is a graph illustrating the peak intensity ratio of palladium oxide to palladium in each catalyst.

In the X-ray diffraction pattern thus obtained, the results of the ratio of the intensity of peak attributed to palladium oxide at a diffraction angle 2θ-33.5° to the intensity of peak attributed to palladium at 2θ-40.2° are illustrated in FIG. 3.

<Test for Evaluation on Catalytic Performance>

Figure 4:
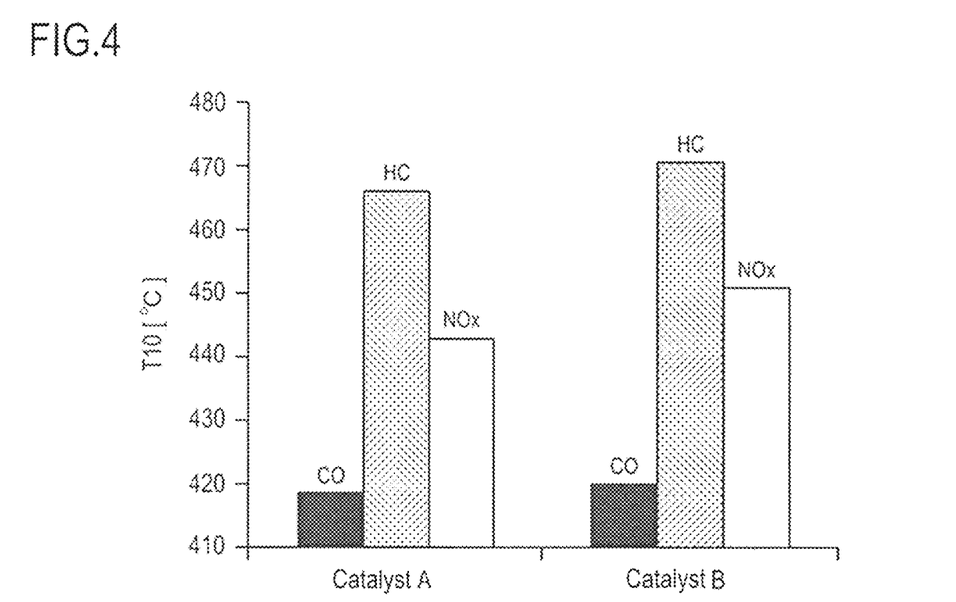
FIG. 4 is the evaluation results of each catalyst by an objective engine and the results illustrating the temperature (T10) when the purification rate reaches 10%.

The catalyst A obtained in Example 1 and the catalyst B obtained in Comparative Example 1 were subjected to the heat resistance treatment described above and then installed to the position at 30 cm on the downstream side from the exhaust port of an in-line 6-cylinder 2.4-liter MPI gasoline engine. The A/F was set to 14.6, the temperature at the catalyst inlet was raised from 100° C. to 500° C., the gas discharged from the catalyst outlet was sampled, and each purification rate of CO, THC, and NO was calculated. The results are illustrated in FIG. 4 by denoting the temperature when each purification rate reaches 10% as T10.

<Particle Diameter of Pd>

Figure 5:
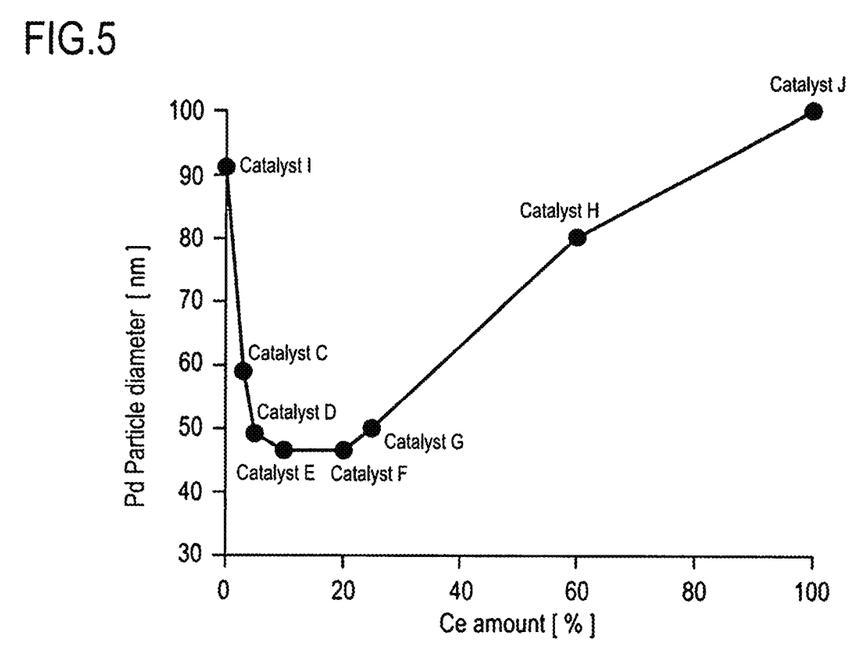
FIG. 5 is a graph illustrating the particle diameter of palladium in a catalyst of the present invention and a catalyst for comparison.

The catalysts C to H obtained in Examples 2 to 7 and the catalysts I and J obtained in Comparative Examples 2 and 3 were subjected to the heat resistance treatment described above and then to the TEM measurement to measure the particle diameter of palladium. The particle diameter of palladium thus measured is illustrated in FIG. 5.

<Test for Evaluation on Catalytic Performance>

The catalysts C to H obtained in Examples 2 to 7 and the catalysts I and J obtained in Comparative Examples 2 and 3 were subjected to the heat resistance treatment described above and then mixed with NO, CO, $C_3H_8$, $O_2$, $H_2$, and $CO_2$ such that the A/F was 14.6, the temperature at the catalyst inlet was raised from 100° C. to 500° C., the gas discharged from the catalyst outlet was sampled, and each purification rate of CO, THC, and NO was calculated. The results are presented in Table 2 by denoting the temperature when each purification rate reaches 50% as T50.

TABLE 2

| Catalyst (% by mass of cerium in palladium-supporting substrate per cerium oxide) | CO (° C.) | HC (° C.) | NOx (° C.) |
|---|---|---|---|
| Catalyst I (0%) | 269 | 291 | 301 |
| Catalyst C (3%) | 262 | 283 | 293 |
| Catalyst D (5%) | 258 | 280 | 290 |
| Catalyst E (10%) | 257 | 277 | 287 |
| Catalyst F (20%) | 256 | 275 | 285 |
| Catalyst G (25%) | 256 | 275 | 285 |
| Catalyst H (60%) | 265 | 287 | 296 |
| Catalyst J (100%) | 278 | 292 | 296 |

The invention claimed is:

1. An exhaust gas purifying catalyst having two or more catalyst layers on a three-dimensional structure, wherein the two or more catalyst layers comprise a lower layer comprising a palladium-supporting cerium-aluminum composite oxide, wherein palladium is supported on a cerium-aluminum composite oxide containing cerium at from 3 to 60% by mass in terms of cerium oxide, and an upper layer comprising a rhodium-supporting inorganic oxide, wherein rhodium is supported on the inorganic oxide, and the inorganic oxide is not a combination of cerium and aluminum, cerium in the cerium-aluminum composite oxide is uniformly dispersed in the cerium-aluminum composite oxide, a part of palladium supported is aluminum-cerium-palladium composite in X-ray diffraction measurement by CuKα ray after the exhaust gas purifying catalyst is exposed to a high temperature of 1000° C. or higher, and the aluminum-cerium-palladium composite is $Al_xCe_yPd_z$, wherein x=9 to 1, y=5 to 1, and z=7 to 1.

2. The exhaust gas purifying catalyst according to claim 1, wherein the aluminum-cerium-palladium composite is $Al_{5.0}Ce_{1.7}Pd_{3.3}$.

3. The exhaust gas purifying catalyst according to claim 1, wherein a ratio of a peak intensity located at a diffraction angle 2θ=33.5° to a peak intensity located at 40.2° is from 0.18 to 0.45 in said X-ray diffraction measurement by CuKα ray after the exhaust gas purifying catalyst is exposed to a high temperature of 1000° C. or higher.

4. The exhaust gas purifying catalyst according to claim 1, wherein a mass ratio of palladium to rhodium is from 0.005 to 40.

5. The exhaust gas purifying catalyst according to claim 1, wherein a mass ratio of palladium to cerium-aluminum composite oxide is from 0.005 to 50% by mass.

6. A method of treating exhaust gas, comprising treating exhaust gas containing a phosphorus compound by using the catalyst according to claim 1.

7. The exhaust gas purifying catalyst according to claim 1, wherein an average particle diameter of the cerium-aluminum composite is 0.5 to 150 μm.

* * * * *